United States Patent [19]
Trolliet

[11] 3,896,375
[45] July 22, 1975

[54] SYSTEM FOR MONITORING AND INDICATING PEAK VALUES OF A TIME VARYING SIGNAL

[75] Inventor: Philippe Trolliet, Montreal, Canada

[73] Assignee: Her Majesty the Queen in Right of Canada as represented by the Secretary of State, Ottawa, Canada

[22] Filed: Feb. 6, 1974

[21] Appl. No.: 439,919

[52] U.S. Cl............................ 324/103 P; 324/121 R
[51] Int. Cl...................... G01r 19/16; G01r 13/20
[58] Field of Search ............ 324/103 P, 103 R, 111, 324/121 R; 328/116

[56] References Cited
UNITED STATES PATENTS

| | | | |
|---|---|---|---|
| 2,468,687 | 4/1949 | Schmitt | 324/111 |
| 2,486,890 | 11/1949 | Stanmyre | 324/103 R |
| 3,119,984 | 1/1964 | Brandt et al. | 324/111 |
| 3,127,565 | 3/1964 | Williams | 324/103 P |
| 3,383,594 | 5/1968 | Fiorletta et al. | 324/121 R |
| 3,633,101 | 1/1972 | Johnson et al. | 324/102 |

Primary Examiner—Alfred E. Smith
Assistant Examiner—Ernest F. Karlsen
Attorney, Agent, or Firm—Alan Swabey; Robert E. Mitchell

[57] ABSTRACT

This invention relates to a system for monitoring and indicating peak values of an audio signal. The system is especially useful in replacing the standard VU-meter presently used on the audio mixing and recording consoles of movie and television editor desks. The VU-meter has the disadvantage of monitoring and displaying average values. The inventive system monitors and displays peak audio values. The system consists of a balanced input amplifier for receiving and amplifying the monitored signals. The amplified signals are fed to a rectifier circuit which supplies a rectified output of the signal, and the rectified signal is fed to a peak detector means which retains the peaks of the rectified signal. The output of the peak detector means is fed to a comparator which compares the peak values with reference sources, and the output of the comparator drives a display means. Preferably, the display means includes a first numerical display for indicating the highest peak value attained in a series of observations, as well as a moving dot display for indicating ongoing peak values in the series.

9 Claims, 9 Drawing Figures

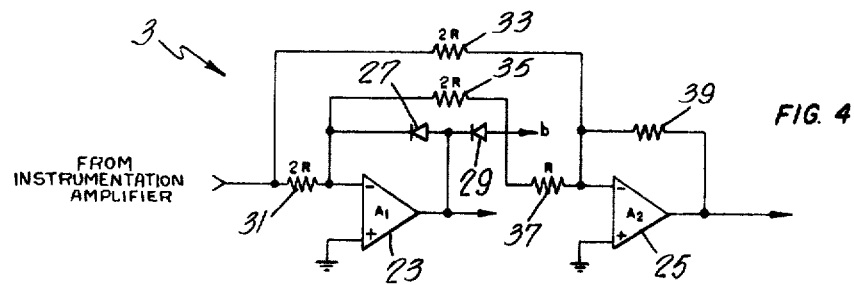
FIG. 4
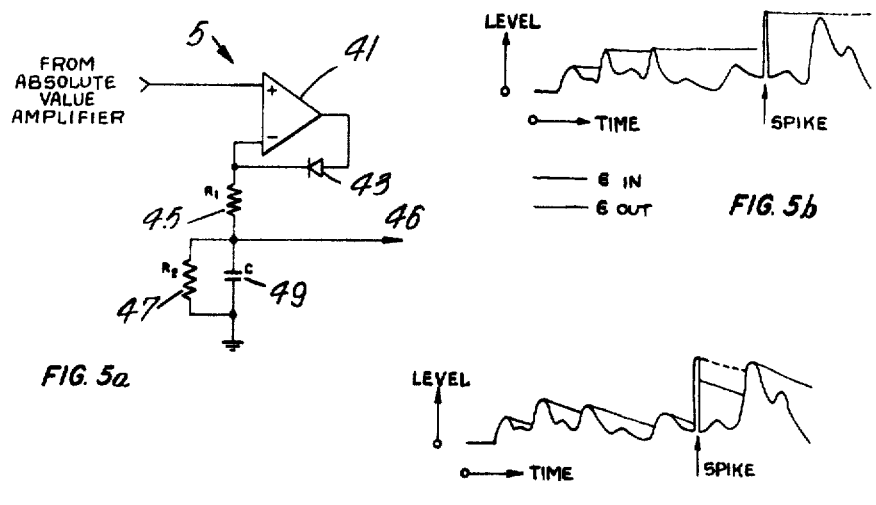
FIG. 5a
FIG. 5b
— ∈ IN
— ∈ OUT
FIG. 5c
— ∈ IN
— ∈ OUT
----- ∈ OUT WITHOUT R1
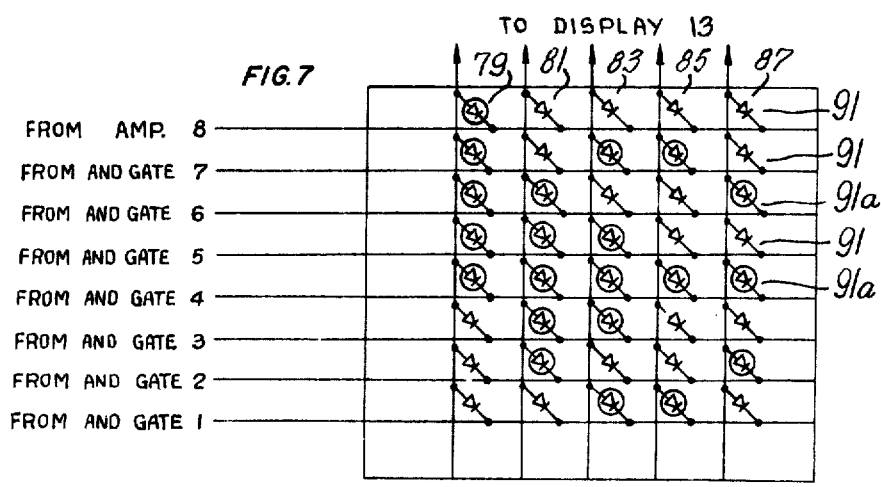
FIG. 7

SYSTEM FOR MONITORING AND INDICATING PEAK VALUES OF A TIME VARYING SIGNAL

BACKGROUND OF THE INVENTION

1. Field of the Invention

This invention relates to a system for monitoring and indicating values of time varying signals. More specifically, this invention relates to a system for monitoring and indicating peak values of an audio signal.

2. Statement of the Prior Art

The standard VU-meter (Volume Unit-meter) is an instrument which was designed to measure and provide a visual indication of audio signal levels indicative of the intensity of the signals, and is used, for example, in the audio mixing and recording console of movie and television editor desks to improve or maintain high sound quality at all stages of the electronic and mechanical transmission of the sound. However, the VU-meter measures average values of the audio levels, although it is sometimes erroneously assumed that it measures RMS values. The VU-meter is calibrated using a sine wave, and it will readily be appreciated that the difference in indicated values between average value and peak value can be substantial.

When it is considered that the major source of audio distortion in the transmission and storage of sound results from clipping in the amplifiers and saturation of magnetic tape when the intensity of the sound increases to an unacceptable level, the importance of peak value indication is immediately seen.

SUMMARY OF THE INVENTION

It is therefore an object of the invention to provide a system which measures and gives an indication of peak levels of an audio signal.

The same principles could, as will be easily seen, be used to measure and indicate signals which are not in the audio frequency range.

In accordance with the invention, a system for monitoring and indicating peak values of a time varying signal comprises;

an input amplifier for receiving and amplifying said signals;

rectifying means, fed from said input amplifier and providing a rectified output;

peak detector means, receiving said rectified output and retaining peak values of said rectified output and providing said peak values at its output;

comparator means for comparing said peak values with reference values, said comparator means being fed with said peak detector means output and providing a display driving signal; and display means, driven by said display driving signal, to provide a display representative of the peak values.

Preferably, the display means comprises a numerical display for indicating the highest peak value attained in a series of observations, and a moving dot display for indicating ongoing peak values in said series.

Such a system further comprises decoder means between said comparator means and said numerical display for providing a driving signal for said first stationary numerical display.

Usually, the time varying signal will be a signal in the audio range.

BRIEF DESCRIPTION OF THE DRAWINGS

The invention will be better understood by an examination of the following description, together with the accompanying drawings, in which:

FIG. 4 is a more detailed illustration of the absolute value amplifier of the system;

FIG. 5a–5c is a more detailed illustration of the peak detector of the meter and amplifier as well as graphical representations useful in explaining the operation of the peak detector;

FIG. 7 is an illustration of an example of a decoder which forms a part of the system.

DETAILED DESCRIPTION OF THE DRAWINGS

Figure 1:
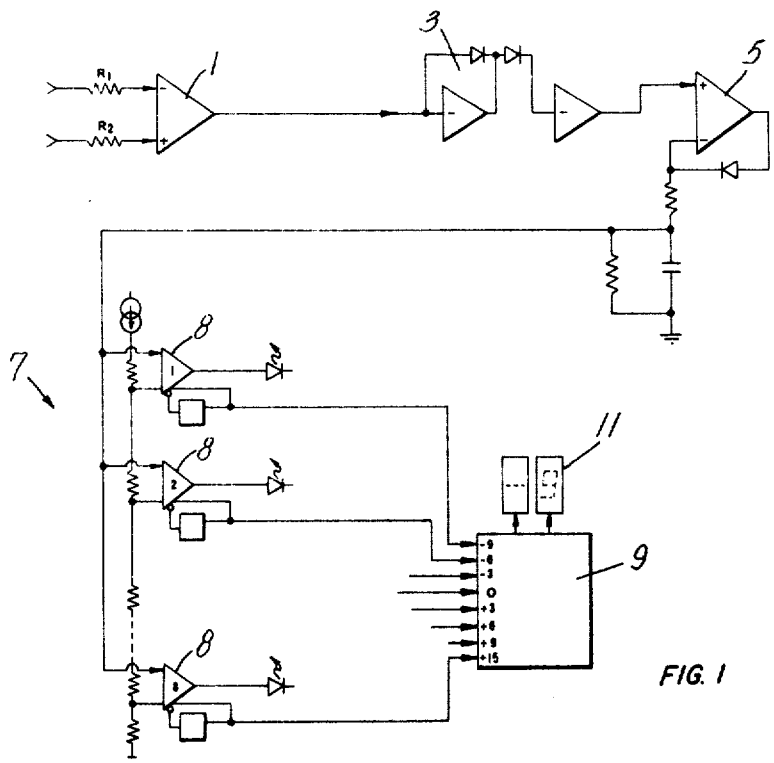
FIG. 1 is a schematic drawing of the inventive system.

Referring now to FIG. 1, the system comprises an instrumentation amplifier 1 with a balanced input, followed by an absolute value amplifier 3. As will be seen below, the absolute value amplifier rectifies its input, and the rectified output of the absolute value amplifier is fed to a peak detector 5 where the peaks of the rectified signal are retained.

The output of the peak detector is fed to the comparator unit 7 which comprises a series of comparator amplifiers 8 to be described in greater detail below. The comparator amplifiers are differential amplifiers with one input fed from the output of the peak detector and the other input fed from a reference source.

The output of the comparator unit is fed to a decoder 9, and the output of the decoder drives a display 11.

Figure 2:
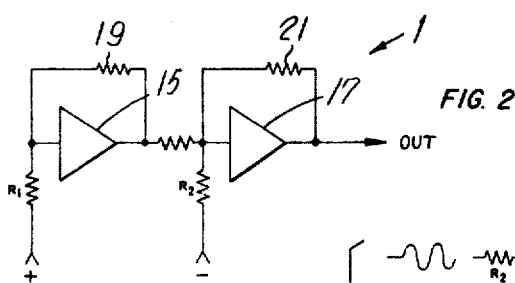
FIG. 2 is a more detailed illustration of the instrumentation amplifier of the system.

The instrumentation amplifier 1 is schematically shown in FIG. 2 and consists of two amplifiers 15 and 17 connected in series. The amplifiers 15 and 17 include feedback resistors 19 and 21 respectively, and one input terminal of the system is connected to amplifier 15 while the other input terminal of the system is connected to amplifier 17. An instrumentation amplifier was selected for the following reasons:

a. The input is of the differential type and, being balanced, simplifies its adaptation to all professional audio systems;

b. The input impedance can be 100 Kohms whereby to avoid loading the audio line and whereby to make it possible to connect it at any point in a transmission system;

c. Its common mode rejection ratio can be made better than 45 db using resistors with a 5% tolerance. This ratio can further be appreciably improved by pairing the input resistors (R1 and R2) and the feedback resistors. Further, it can be designed to reject signals in the common mode at appreciable levels, for example, 50 volts;

d. As can be seen from FIG. 3, the amplifier can be designed to permit summation of several inputs.

Figure 3:
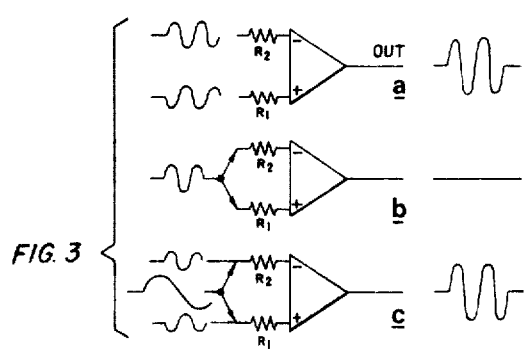
FIG. 3 shows graphical representation useful in explaining the operation of the instrumentation amplifier.

FIG. 3 shows the dynamic response of the amplifier.

FIG. 4 shows the detailed circuit of the absolute value amplifier 3. The amplifier consists of two differential amplifiers 23 and 25. The output of the instrumentation amplifier is fed, through resistor 31, to one input of amplifier 23 and, though resistor 33, to the same polarity input of the amplifier 25. The signal on the other side of resistor 31 is fed, through the resistors 35 and 37, to the one polarity input terminal of amplifier 25. Diode 27 comprises a feedback path for amplifier 23, and diode 29 is between the output of amplifier 23 and the input of amplifier 25. Resistor 29 comprises a feedback path for amplifier 25. The relative values of resistors 31 to 39 is shown in the drawing.

The absolute value amplifier 3 rectifies the input signal to provide a full wave rectified signal at its output. As is well known, a diode in series with a signal will provide a half wave rectified signal with a certain amount of overshoot in the negative direction due to the inverse dielectric current of the diode. If the diode is placed in the feedback path of an operational amplifier, the dielectric current of the diode will be cancelled by the very high gain of the amplifier so that such a circuit will provide a half wave rectified output with substantially no negative overshoot. This is the reason for the use of the differential amplifiers 23 and 25.

In the amplifier 3, differential amplifier 23, rectifies the signal inverting the positive going portions and eliminating the negative going portions. Amplifier 25 reverses the negative going portions of the input signal. It also reverses the inverted positive half waves from amplifier 23. Thus, the signal appearing at the output of amplifier arrangement 3 is a positive going full wave rectified signal. The advantage of the described circuit is that it will permit the rectification of very small signals (of the order of a millivolt), with very good linearity and frequency response.

The purpose of the peak detector, shown in detail in FIG. 5a, is to retain the peak value provided by the absolute value amplifier. The peak value detector 5 consists of an operational amplifier 41 with one input thereof receiving the outut from the absolute value amplifier. The output of the amplifier is fed, through diode 43, to the other input of the amplifier as well as to the circuit arrangement consisting of resistors 45 and 47 and capacitor 49. 46 is the output terminal of the detector.

FIG. 5b shows the response of the circuit without the resistors 45 and 47. As can be seen, when the input is reduced, the output does not follow the input because there is no circuit for discharging the capacitor except for the weak input current of the amplifier. By providing resistor 47, a discharge path is provided for the capacitor 49. Resistor 45 insures that transients, with very fast rise times, will not be detected as resistor 45 slows down the charging rate of the capacitor. The amplifier 50 is a high impedance amplifier with a gain of 1 and provides isolation between the absolute value amplifier and the comparator section.

Figure 6:
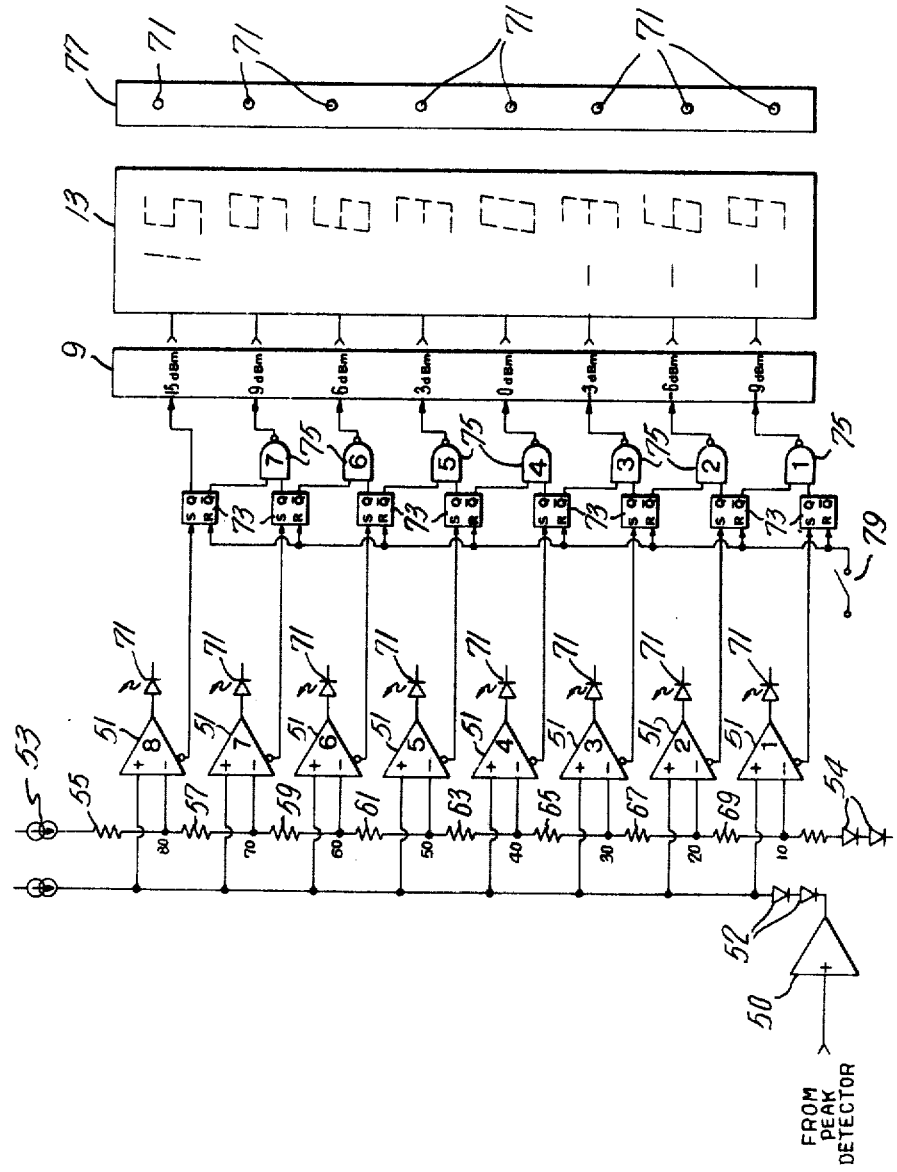
FIG. 6 is an illustration of the comparator portion of the system.

The comparator section is illustrated in greater detail in FIG. 6. As can be seen, the comparator section comprises a plurality of comparator amplifiers 51 (numbered 1 to 8). The comparator amplifiers will provide an output only when the input on the plus terminal is greater than the input on the minus terminal. The plus terminals are fed from the output of the peak detectors through amplifiers 50 and diodes 52. The minus terminals are fed from a reference source 53 through a potential divider consisting of resistors 55 to 69 inclusive. The diodes 54 serve to insure that the reference point of response of the 0 volt level is above ground to insure safe switching.

The output of each amplifier drives an LED 71, and all of the LEDS form a dot display 77 as shown at the extreme right hand of the figure. A clamp output terminal of the amplifier is fed to the SET terminal of SR flip-flops 73. The Q output of all flip-flops but the top one are fed to AND gates associated with their respective stages (and numbered 1 to 7 respectively), and the $\overline{Q}$ terminals of all flip-flops but the bottom one are fed to the other input terminals of AND gates associated with the stage below the respective flip-flops. The outputs of the AND gates are fed to decoder 9, and the output of the decoder drives display 13. Reset switch 79 is provided to reset all of the flip-flops as required.

Because of the voltage divider arrangment at the minus inputs of the comparator amplifiers, the voltage at each of these inputs will be different. For purposes of illustration only, these values have been illustrated as 10, 20, 30, 40, 50, 60, 70 and 80 at the inputs to comparator amplifiers 1, 2, 3, 4, 5, 6, 7 and 8 respectively. The inputs at the plus terminals of all amplifiers will, on the other hand, be identical to one another and will be equal to the output of the amplifier 50. This output is, of course, representative of the value at the input of the system.

To explain the operation of the comparator section, several examples are given below. Assuming that operation is just beginning and that none of the values on the display 13 are illuminated and that none of the dots 71 on the dot display 77 are illuminated, and that all flip-flops are in the RESET state, i.e., there is a high only at the $\overline{Q}$ terminals thereof, so that all AND gates are closed. The system receives an input which causes an output of 35 at the output of the amplifier 50. When this output is applied to the plus terminals of the amplifiers 51, outputs will appear at amplifiers 1, 2 and 3 to light up the bottom three LEDS of the display 77. Outputs will not appear at the other amplifiers as their minus terminal input is greater than their plus terminal inputs.

The clamp output terminals of amplifiers 1 to 3 will provide a signal to the SET terminals of the flip-flops associated with their respective stages to set the respective flip-flops thereby to change their state so that a high appears at the Q terminals of these flip-flops. As can be seen, AND gates 1 and 2 will remain closed as the $\overline{Q}$ terminals of the flip-flops feeding them are now low. AND gate 3, however, will be open as both of its inputs are high. Thus, a driving signal will be fed to the input terminals of the decoder adjacent to the output terminal of AND gate 3, and the "—3" lights of the display will be illuminated. It is noted that AND gates 4 to 7 will remain closed.

In summary, then, an output of 35 from amplifier 50 will cause the bottom three dots on display 77 to be illuminated and it will also cause the "—3" lights of the display 13 to be illuminated.

If the output of amplifier 50 is now changed to 53, fourth and fifth flip-flops will be set, AND gate 3 will be closed, and AND gate 5 will be opened. The result of this is that the bottom five dots of display 77 will be illuminated and the "3" lights of display 13 will be illuminated.

If the output of amplifier 50 is now decreased to 32, the state of all flip-flops will remain unaltered as signals are not applied to any flip-flops which have not yet been set (the top three flip-flops), and no signals are applied to any of the RESET terminals. Thus, the "3"

lights of display 13 will remain illuminated. Amplifiers 4 and 5, on the other hand, will no longer be providing outputs to illuminate their associated LED's 71, so that only the bottom three dots 71 of the display 77 will be illuminated.

It can thus be seen that the flip-flops 73 act as a memory to retain the highest peak value attained in any series of observations, and this value remains displayed on display 13. Therefore, an operator has both a stationary display of the highest peak value attained on display 13 as well as a moving display of ongoing levels on dot display 77. This is believed to be the most convenient and useful arrangement although it can be seen that, by providing different connections of the output and clamp output terminals of the amplifiers, both displays could be made stationary, or both displays could be moving displays, or the display 13 could be made moving and the display 77 could be made stationary. It will, of course, also be appreciated that the output of the amplifiers could drive only one display.

A decoder for driving the numerical display 13 is shown in FIG. 7. It is assumed that a binary signal, corresponding to the number of the display 13, is required to drive the display. In FIG. 7, the decoder comprises a diode matrix having a plus and minus column 79 and $2^0$, $2^1$, $2^2$ and $2^3$ columns 81, 83, 85 and 87 respectively. The rows are supplied from AND gates 1 to 7 and from amplifier 8 as shown in the figure. The matrix comprises operating diodes 91 and non-operating diodes 91a (encircled). The output of any diode is zero unless power is applied at its row. The output of the non-operating diodes is zero at all times.

As can be seen, when an input is supplied from AND gate 6, the output 0 (which is plus as it fails to illuminate the "−" lights) 0110 (binary 6) is supplied to display 13, and when an input is supplied from AND gate 1, the output of the matrix is 11001, i.e., −9.

Displays with driving circuits are available as complete packages, and all that is required is a matrix to provide a signal appropriate to the driving circuit of the selected display.

In operation, the complete system works as follows: A balanced input is amplified in the instrumentation amplifier 1 whose output is applied to the absolute value amplifier 3. The output of the amplifier 3 is a full wave rectified signal which is applied to the input of peak detector 5. The peaks at the output of the peak detector are compared with reference signals in the comparator 7 as above-described, and the output of the comparator drives LEDS 71 on dot display 77 and numerical display 13 as above-described.

Although only one embodiment was described, this was for the purpose of illustrating, but not limiting, the invention. Various modifications which will come readily to the mind of one skilled in the art are within the scope of the invention as defined in the appended claims.

I claim:

1. A system for monitoring and indicating peak values of a time varying signal comprising:
    an input amplifier for receiving and amplifying said signals;
    rectifying means, fed from said input amplifier and providing a rectified output;
    peak detector means, receiving said rectified output and retaining peak values of said rectified output and providing said peak values at its output;
    a voltage source in series with a potential divider having a plurality of output terminals for providing a different reference value at each said output terminal;
    comparator means comprising a plurality of differential amplifiers, each differential amplifier having a first input terminal and a second input terminal and a first output terminal;
    said peak detector means output being connected to all of said first input terminals;
    a different one of said output terminals of said potential divider being connected to a different one of each of said second input terminals;
    the first output terminal of said differential amplifiers providing a display driving signal; and
    display means comprising a numerical display for indicating the highest peak value attained in a series of observations, and a moving dot display for indicating ongoing peak values in said series.

2. A system as defined in claim 1 and further comprising decoder means between said comparator means and said numerical display for providing a driving signal for said first stationary numerical display.

3. A system as defined in claim 2 wherein said time varying signal is a signal in the audio range.

4. A system as defined in claim 2 wherein said input amplifier is a differential amplifier having an output terminal and two input terminals to receive a balanced input of said time varying signal.

5. A system as defined in claim 2 wherein said rectifying means comprises a first differential amplifier having an input terminal and an output terminal;
    a diode in a feedback path between said output terminal and said input terminal;
    a second differential amplifier having an input terminal and an output terminal; and
    a second diode between the output terminal of said first differential amplifier and the input terminal of said second differential amplifier.

6. A system as defined in claim 2 wherein said peak detector means comprises an operational amplifier with a gain of 1 and two input terminals and an output terminal;
    the output terminal being connected to the input terminal through a first diode;
    a first resistor at the junction of said input terminal and said diode;
    a capacitor in series with a first resistor;
    and a second resistor in parallel with said capacitor;
    the output terminal of said peak detector means being connected to the junction of said first resistor and said capacitor.

7. A system as defined in claim 2 wherein said comparator means further comprises;
    a plurality of SR flip-flops, equal to the plurality of differential amplifiers, each flip-flop comprising a SET terminal, a RESET terminal, a Q output terminal, and a $\overline{Q}$ output terminal;
    the clamp output terminal of each differential amplifier being connected to the SET terminal of a respective flip-flop;
    a reset switch connected to the RESET terminals of all of said plurality of SR flip-flops;
    a plurality of AND gates having two input terminals and an output terminal; said plurality of AND gates being one less than the plurality of differential amplifiers;

said comparator comprising a first differential amplifier, a first SR flip-flop and a first AND gate associated with a first stage of said comparator; a last differential amplifier and a last SR flip-flop associated with a last stage of said comparator; the remaining differential amplifiers, SR flip-flops and AND gates being associated in respective intermediate stages of said comparator;

the Q output terminals of the SR flip-flops associated with all stages except the last stage being connected to a first input of the AND gate of said stage;

the $\overline{Q}$ output terminals of the SR flip-flops associated with all stages except the first stage being connected to the second input of the AND gate of an earlier stage;

the output terminals of each said AND gates being fed to said decoder means;

the Q output terminal of said SR flip-flop of said last stage being also fed to said decoder means.

8. A system as defined in claim 7 wherein the output of each differential amplifier is fed to a separate LED, the plurality of LEDS comprising said moving dot display.

9. A system for monitoring and indicating peak values of an audio signal comprising;

input means comprising a first differential amplifier having an output terminal and two input terminals to receive a balanced input of said audio signal;

rectifying means comprising a second differential amplifier having an input terminal and an output terminal;

the input terminal of said second differential amplifier being connected to the output terminal of said first differential amplifier;

a diode in a feedback path between said output terminal of said second differential amplifier and said input terminal;

a third differential amplifier having an input terminal and an output terminal;

a second diode between the output terminal of said second differential amplifier and the input terminal of said third differential amplifier;

peak detector means comprising a first operational amplifier with a gain of 1 to two input terminals and an output terminal;

one input terminal of said operational amplifier being connected to the output terminal of said third differential amplifier;

the output terminal of said first operational amplifier being connected to the other input terminal of said first operational amplifier through a third diode;

a first resistor at the junction of said input terminal of said first operational amplifier and said third diode;

a capacitor in series with a first resistor;

and a second resistor in parallel with said capacitor;

an output of said peak detector means being taken at the junction of said first resistor and said capacitor;

reference sources comprising a voltage source in series with a potential divider having a plurality of output terminals;

and comparator means comprising a plurality of further differential amplifiers, each having a first input terminal and a second input terminal and a first output terminal and a clamp output terminal;

said peak detector means output being connected to all of said first input terminals of said further differential amplifiers;

a different one of said output terminals of said potential divider being connected to a different one of each of said second input terminals of said further differential amplifiers;

a plurality of SR flip-flops, equal to the plurality of further differential amplifiers, each flip-flop comprising a SET terminal, a RESET terminal, a Q output terminal, and a $\overline{Q}$ output terminal;

the clamp output terminal of each further differential amplifier being connected to the SET terminal of a respective flip-flop;

a reset switch connected to the RESET terminals of all of said plurality of SR flip-flops;

a plurality of AND gates having two input terminals and an output terminal; said plurality of AND gates being one less than the plurality of further differential amplifiers;

said comparator comprising a first further differential amplifier, a first SR flip-flop and a first AND gate associated with a first stage of said comparator; a last further differential amplifier and a last SR flip-flop associated with a last stage of said comparator; the remaining further differential amplifiers, SR flip-flops and AND gates being associated in respective intermediate stages of said comparator;

the Q output terminals of the SR flip-flops associated with all stages except the last stage being connected to a first input of the AND gate of said stage;

the $\overline{Q}$ output terminals of the SR flip-flops associated with all stages except the first stage being connected to the second input of the AND gate of an earlier stage;

said system further comprising display means including a numerical display for indicating the highest peak value attained in a series of observations, and a moving dot display for indicating ongoing peak values in said series;

decoder means between said comparator means and said numerical display for providing a driving signal for said first stationary numerical display;

the output terminals of each said AND gates being fed to said decoder means;

the Q output terminal of said SR flip-flop of said last stage being also fed to said decoder means; and the output of each further differential amplifier being fed to a separate LED, the plurality of LEDS comprising said moving dot display.

* * * * *